United States Patent
Tahaei et al.

(10) Patent No.: US 12,236,337 B2
(45) Date of Patent: Feb. 25, 2025

(54) METHODS AND SYSTEMS FOR COMPRESSING A TRAINED NEURAL NETWORK AND FOR IMPROVING EFFICIENTLY PERFORMING COMPUTATIONS OF A COMPRESSED NEURAL NETWORK

(71) Applicants: Marziehsadat Tahaei, Montreal (CA); Ali Ghodsi, Waterloo (CA); Mehdi Rezagholizadeh, Montreal (CA); Vahid Partovi Nia, Montreal (CA)

(72) Inventors: Marziehsadat Tahaei, Montreal (CA); Ali Ghodsi, Waterloo (CA); Mehdi Rezagholizadeh, Montreal (CA); Vahid Partovi Nia, Montreal (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 892 days.

(21) Appl. No.: 17/322,674

(22) Filed: May 17, 2021

(65) Prior Publication Data

US 2022/0366226 A1 Nov. 17, 2022

(51) Int. Cl.
G06N 3/04 (2023.01)
G06N 3/063 (2023.01)
G06N 3/08 (2023.01)

(52) U.S. Cl.
CPC ............ *G06N 3/063* (2013.01); *G06N 3/04* (2013.01); *G06N 3/08* (2013.01)

(58) Field of Classification Search
CPC ............ G06N 3/063; G06N 3/04; G06N 3/08
See application file for complete search history.

(56) References Cited

U.S. PATENT DOCUMENTS

| 2018/0268292 A1* | 9/2018 | Choi | G06V 10/454 |
| 2018/0336465 A1* | 11/2018 | Kim | G06N 7/01 |
| 2021/0125070 A1* | 4/2021 | Wang | G06N 3/063 |

FOREIGN PATENT DOCUMENTS

| CN | 109711544 A | 5/2019 |
| CN | 110175628 A | 8/2019 |

(Continued)

OTHER PUBLICATIONS

Zhou et al ("Exploiting Local Structures with the Kronecker Layer in Convolutional Networks" 2016) (Year: 2016).*

(Continued)

*Primary Examiner* — Lut Wong

(57) ABSTRACT

Methods and systems for compressing a neural network (NN) which performs an inference task and for performing computations of a Kronecker layer of a Kronecker NN are described. Data samples are obtained from a training dataset. The input data of the data samples are inputted into a trained NN to generate NN predictions for the input data. Further, the input data are inputted into a Kronecker NN to generate Kronecker NN predictions for the input data. Two losses are computed: a knowledge distillation loss, based on outputs generated by a layer of the NN and a corresponding Kronecker layer of the Kronecker NN and a loss for Kronecker layer, based on the Kronecker NN predictions and ground-truth labels of the data samples. The two losses are combined into a total loss, which is propagated through the Kronecker NN to adjust values of learnable parameters of the Kronecker NN.

20 Claims, 7 Drawing Sheets

(56) References Cited

FOREIGN PATENT DOCUMENTS

| CN | 110909865 A | | 3/2020 | |
| CN | 111738436 A | * | 10/2020 | ............... G06N 3/08 |
| CN | 112131967 A | | 12/2020 | |

OTHER PUBLICATIONS

Jain et al ("Symmetric k-Means for Deep Neural Network Compression and Hardware Acceleration on FPGAs" May 2020) (Year: 2020).*

Bhardwaj et al ("Memory- and Communication-Aware Model Compression for Distributed Deep Learning Inference on IoT" 2019) (Year: 2019).*

James T. O' Neill ("An Survey of Neural Network Compression" 2020) (Year: 2020).*

Van Loan, Charles F., "The ubiquitous Kronecker product.", Journal of computational and applied mathematics 123.1-2 (2000).

Hinton, Geoffrey, Oriol Vinyals, and Jeff Dean., "Distilling the knowledge in a neural network.", arXiv preprint arXiv:1503.02531 (2015).

Zhou, Shuchang, et al., "Exploiting local structures with the kronecker layer in convolutional networks.", arXiv preprint arXiv:1512.09194 (2015).

Thakker, Urmish, et al., "Compressing rnns for iot devices by 15-38x using kronecker products.", arXiv preprint arXiv:1906.02876 (2019).

Thakker, Urmish, et al. "Compressing language models using doped kronecker products." arXiv preprint arXiv:2001.08896 (2020).

Jiao, Xiaoqi, et al. "TinyBERT: Distilling BERT for natural language understanding." arXiv preprint arXiv:1909.10351 (2019).

Mao, Yihuan, et al. "LadaBERT: Lightweight adaptation of BERT through hybrid model compression." arXiv preprint arXiv:2004.04124 (2020).

Jia-Nan Wu, "Compression of Fully-connected Layer in Neural Network by Kronecker Product", School of Electronic Information and Electrical Engineering, Feb. 2016.

* cited by examiner

| NN type | Compression Factor | MNLI | MNLI-mm | SST-2 | MRPC | QNLI | Average |
|---|---|---|---|---|---|---|---|
| BERT NN | x 1 | 83.9 | 83.4 | 93.4 | 87.9 | 90.9 | 87.9 |
| LadaBERT NN | x 10 | 77.8 | 76.1 | 84.0 | - | 75.1 | 62.6 |
| Kronecker-BERT NN | x 7.5 | 82.4 | 81.6 | 90.3 | 86.1 | 89.3 | 85.94 |
| Kronecker-BERT NN | x 16 | 80.5 | 80.1 | 90.3 | 86.6 | 87.4 | 84.98 |

FIG. 7

METHODS AND SYSTEMS FOR COMPRESSING A TRAINED NEURAL NETWORK AND FOR IMPROVING EFFICIENTLY PERFORMING COMPUTATIONS OF A COMPRESSED NEURAL NETWORK

FIELD

This disclosure relates to artificial neural networks. More particularly, the present application relates to methods and systems for compressing a trained neural network and for efficiently performing computations of a compressed neural network.

BACKGROUND

Artificial neural networks (NNs) are computing systems that are modeled on how biological brains operate. There are several NN architectures such as feedforward NN, convolutional NN, transformers, etc., but one of which is briefly explained herein. Feedforward NNs are made up of a number of feedforward layers (e.g., computational blocks) that each include a plurality of computational units (called neurons), with connections among computational units of different layers. Each computational unit (e.g., each neuron) in a feedforward NN transforms data using a series of computations. The computations performed by each respective feedforward layer (e.g. computational block) include a matrix multiplication between a set of input values and a respective set of weights to generate a matrix multiplication result, adjusting the matrix multiplication result by a respective bias (if it exists) of the computational block, and applying an activation function to the adjusted matrix multiplication result to introduce non-linearity and to generate an output based on the activation function applied. The series of computations are repeated by each feedforward layer until a final output layer of the feedforward NN generates scores or predictions related to a particular inference task.

NNs perform inference tasks, such as object detection, image classification, natural language processing, speech recognition, clustering, voice recognition, or pattern recognition. NNs typically do not need to be programmed with any task-specific rules. Instead, NNs generally perform supervised learning to build knowledge from datasets where the right answer is provided in advance. An NN learns by iteratively tuning the values of learnable parameters (e.g. weights and biases) applied at its neurons until the NN can predict the right answer on its own. A NN approximates a function and are usually referred to as NN models.

NNs have become larger (i.e., deeper) and more complicated. This has inevitably increased the number of layers in the NN and size of the layers in the NNs to the point where it can be costly to implement the NNs in software or hardware. NNs increasingly rely on the usage of specially designed, computationally powerful hardware devices that include one or more processing units, accelerators (e.g., accelerators designed to perform certain computations of the NNs, such as matrix multiplication) and supporting memory to perform the computations of each layer of the NN (hereinafter referred to generally as NN computations and individually as NN computation). In some examples, a processing unit (i.e. host processor), an accelerator and supporting memory are packaged in a single integrated circuit which can perform computations of a NN. The computationally powerful hardware devices required for executing NN computations come with an increased financial cost, as well as ancillary costs in terms of physical space and thermal cooling requirements.

Further, a NN, especially a deep NN, has a very large number of values of learnable parameters, which makes a trained NN (a NN with learned values for its learnable parameters) nearly impossible to deploy to a resource-constrained hardware device, such as an edge computing device, for prediction. Accordingly, there is a growing interest in techniques for compressing NN, such as NN layer compression that may reduce the number of NN computations performed by a NN which performs a particular inference task. For instance, a compressed NN may require less powerful processing units that include less memory and/or power to perform its NN computations than that required for non-compressed NN.

Accordingly, there is a need for improved methods and systems for compression of NN and for efficiently performing NN computations of such a NN without significantly effecting the performance of NN.

SUMMARY

The present disclosure provides methods and systems for compressing a trained NN which performs an inference task by training a Kronecker NN using knowledge distillation. The trained Kronecker NN performs the same inference task as the trained NN. The Kronecker NN is a NN that includes one or more Kronecker layers. The computations performed by each Kronecker layer include a matrix multiplication between a set of input values and a set of Kronecker product values to generate a matrix multiplication result, adjusting the matrix multiplication result by a respective bias (if it exists) of the computational block, and applying an activation function to the adjusted matrix multiplication result to introduce non-linearity and generate an output. The set of Kronecker product values is obtained by computing Kronecker product for two sets of learnable parameters. The Kronecker product operation makes the computations for the Kronecker layer more efficient than a corresponding feedforward layer of a NN, which does not compute the Kronecker product.

A Kronecker NN generally requires less computational resources (processing cycles, memory, processing power, etc.) to perform its NN computations. The Kronecker NN, after training, may be deployed to a resource-constrained hardware device for making predictions for new input data. The Kronecker NN, when trained, has approximately the same performance as the NN. The NN computations of the Kronecker layers of the Kronecker NN may be performed using tiled matrix multiplication to generate the output of the Kronecker layer of the Kronecker NN.

According to one aspect of the present disclosure, there is provided a method for compressing a neural network which performs an inference task. The method includes training a Kronecker neural network which performs the same inference task using knowledge distillation. The method includes obtaining a batch of data samples from a training dataset, each data sample comprising input data and a respective ground-truth label. Further, the method inputs the input data of the data samples of the batch into the neural network to forward propagate the input data of the data samples of the batch through the neural network and generate neural network predictions for the input data of the data samples of the batch. The method further inputs the input data of the data samples of the batch into a Kronecker neural network to forward propagate the input data of the data samples of the batch through the Kronecker neural network to generate Kronecker neural network predictions for the input data of the data samples of the batch. The method also computes a knowledge distillation loss based on outputs generated by a layer of the neural network and a corresponding Kronecker layer of the Kronecker neural network. The method further computes a loss for the Kronecker neural network based on the Kronecker neural network predictions and ground-truth labels of the data samples of the batch. The method combines the knowledge distillation loss and the loss for the Kronecker neural network to generate a total loss for the Kronecker neural network and back propagates the total loss through the Kronecker neural network to adjust values of learnable parameters of the Kronecker neural network.

The knowledge distillation loss ($L_{KD}$) between the output generated by a Kronecker layer of the Kronecker neural network and the corresponding layer of the neural network may be computed by:

$$L_{KD}(x) = \Sigma_i \lambda^i \mathrm{MSE}(x_{Kronecker}^{i+1}, x_{NN}^{i+1})$$

where $\lambda^i$ is a hyper-parameter for the Kronecker layer of the Kronecker neural network, MSE is the minimum squared error, $x_{Kronecker}^{i+1}$, and $x_{NN}^{i+1}$ are inputs to layers i+1 of the Kronecker neural network and the corresponding layer of the neural network, respectively.

Computing the knowledge distillation loss may be based on outputs generated by a plurality of Kronecker layers of the Kronecker neural network and a corresponding plurality of layers of the neural network.

The Kronecker layer has a first parameter matrix and a second parameter matrix storing learnable parameters of the Kronecker layer of the Kronecker neural network and the method may compute the output of the Kronecker layer is generated by, first, receiving an input matrix storing input data for the Kronecker layer. Then, the method may load the second parameter matrix for the Kronecker layer into a first memory structure. Further, the method may process each of a plurality of tiles of the input matrix successively, each tile comprising a respective subset matrix of the input matrix. The processing of each respective tile may include loading the tile being processed in the first memory structure, then for each element included in the first parameter matrix, the method may load the element in the first memory structure. Further, the method may multiply the second parameter matrix, the tile being processed, and the element to generate a multiplication product matrix; and add the multiplication product matrix to an intermediate tile matrix stored in the first memory structure. When the multiplication product matrix for each of the elements has been added to the intermediate tile matrix, the method stores the intermediate tile matrix as part of an output matrix in a second memory structure.

The first memory structure may be an internal memory of a processor that performs the multiplication. The size of each tile may be the size of the second parameter matrix. In some examples, the learnable parameters of the Kronecker layer of the Kronecker neural network require less memory to store than corresponding parameters of the corresponding layers of the teacher neural network.

According to another aspect of the present disclosure, there is provided a method for computing an output of a Kronecker layer of a Kronecker neural network. The Kronecker layer may have a first parameter matrix and a second parameter matrix storing learnable parameters of the Kronecker layer of Kronecker neural network. The method may receive an input matrix storing input data for the Kronecker layer and loads the second parameter matrix for the Kronecker layer into a first memory structure. Further, method may process each of a plurality of tiles of the input matrix successively. Each tile may comprise a respective subset matrix of the input matrix. When processing each respective tile, the method may load the tile being processed in the first memory structure. Further, for each element included in the first parameter matrix, the method may load the element in the first memory structure. The method then multiplies the second parameter matrix, the tile being processed, and the element to generate a multiplication product matrix and may add the multiplication product matrix to an intermediate tile matrix stored in the first memory structure. When the multiplication product matrix for each of the elements has been added to the intermediate tile matrix, the method may store the intermediate tile matrix as part of an output matrix in a second memory structure.

The first memory structure may be an internal memory of a processor that performs the multiplication. The size of each tile may be the size of the second parameter matrix.

According to another aspect of the present disclosure, there is provided a system comprising a processor and a memory storing instructions. The instructions when executed by the processor device, cause the system to obtain a batch of data samples from a training dataset. Each data sample comprises input data and a respective ground-truth label. Further, the instructions when executed by the processor device, cause the system to input the input data of the data samples of the batch into a neural network to forward propagate the input data of the data samples of the batch through the neural network and generate neural network predictions for the input data of the data samples of the batch. The instructions when executed by the processor device, further cause the system to input the input data of the data samples of the batch into a Kronecker neural network to forward propagate the input data of the data samples of the batch through the Kronecker neural network to generate Kronecker neural network predictions for the input data of the data samples of the batch. The instructions when executed by the processor device, further cause the system to compute a knowledge distillation loss based on outputs generated by a layer of the neural network and a corresponding Kronecker layer of the Kronecker neural network. The instructions, when executed by the processor device, cause the system to compute a loss for the Kronecker neural network based on the Kronecker neural network predictions and ground-truth labels of the data samples of the batch. The instructions when executed by the processor device, further cause the system to combine the knowledge distillation loss and the loss for the Kronecker neural network to generate a total loss for the Kronecker neural network and back propagates the total loss through the Kronecker neural network to adjust values of learnable parameters of the Kronecker neural network.

The knowledge distillation loss ($L_{KD}$) between the output generated by the Kronecker layer of the Kronecker neural network and the corresponding layer of the neural network may be computed by:

$$L_{KD}(x) = \Sigma_i \lambda^i \mathrm{MSE}(x_{Kronecker}^{i+1}, x_{NN}^{i+1})$$

where $\lambda^i$ is a hyper-parameter for the Kronecker layer of the Kronecker neural network, MSE is the minimum squared error, $x_{Kronecker}^{i+1}$, and $x_{NN}^{i+1}$ re inputs to layers i+1 of the Kronecker neural network and the corresponding layer of the neural network, respectively.

Computing the knowledge distillation loss may be based on outputs generated by a plurality of Kronecker layers of the Kronecker neural network and a plurality of layers of the neural network.

The Kronecker layer has a first parameter matrix and a second parameter matrix storing learnable parameters of the Kronecker layer of the Kronecker neural network. The system may compute the output of the Kronecker layer is generated by, first, receiving an input matrix storing input data for the Kronecker layer. Then, the system may load the second parameter matrix for the Kronecker layer into a first memory structure. Further, the system may process each of a plurality of tiles of the input matrix successively, each tile comprising a respective subset matrix of the input matrix. The processing of each respective tile may include loading the tile being processed in the first memory structure, then for each element included in the first parameter matrix, the system may load the element in the first memory structure. Further, the system may multiply the second parameter matrix, the tile being processed, and the element to generate a multiplication product matrix; and may add the multiplication product matrix to an intermediate tile matrix stored in the first memory structure. When the multiplication product matrix for each of the elements has been added to the intermediate tile matrix, the system may store the intermediate tile matrix as part of an output matrix in a second memory structure.

The first memory structure may be an internal memory of a processor that performs the multiplication. The size of each tile is the size of the second parameter matrix. In some examples, the learnable parameters of the Kronecker layer of the Kronecker neural network may require less memory to store than corresponding parameters of the corresponding layers of the neural network.

According some aspects of the present disclosure, there is provided a system for computing an output of a Kronecker layer of a Kronecker neural network where the Kronecker layer has a first parameter matrix and a second parameter matrix storing learnable parameters of the Kronecker layer of Kronecker neural network. The system comprises a processor and a memory storing instructions. The instructions when executed by the processor device, cause the system to receive an input matrix storing input data for the Kronecker layer and loads the second parameter matrix for the Kronecker layer into a first memory structure. Further, the instructions when executed by the processor device, cause the system to processes each of a plurality of tiles of the input matrix successively. Each tile comprises a respective subset matrix of the input matrix. The instructions when executed by the processor device, cause the system to process each respective tile. The instructions when executed by the processor device, further cause the system to load the tile being processed in the first memory structure. Further, for each element included in the first parameter matrix, the instructions when executed by the processor device, cause the system to load the element in the first memory structure. The instructions when executed by the processor device, cause the system to multiply the second parameter matrix, the tile being processed, and the element to generate a multiplication product matrix and adds the multiplication product matrix to an intermediate tile matrix stored in the first memory structure. When the multiplication product matrix for each of the elements has been added to the intermediate tile matrix, the instructions when executed by the processor device, cause the system to store the intermediate tile matrix as part of an output matrix in a second memory structure.

The first memory structure may be an internal memory of a processor that performs the multiplication. The size of each tile may be the size of the second parameter matrix.

BRIEF DESCRIPTION OF THE DRAWINGS

FIG. 7 is a table of experimental results of comparisons of performance of various types of NNs which perform a natural language processing task, according to example embodiments.

Similar reference numerals may have been used in different figures to denote similar components.

DETAILED DESCRIPTION OF THE DRAWINGS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete.

The present disclosure provides a method for compressing a NN which performs an inference task by training a Kronecker NN which performs the same inference task. The Kronecker NN, after training, achieves approximately the same performance as the NN, while both perform the same inference task. The trained Kronecker NN can be deployed to a resource constrained hardware device for execution. The Kronecker NN may have the same number of layers as the NN with one or more of the layers of the Kronecker NN being a Kronecker layer. The present disclosure also provides a method for executing computations of a Kronecker layer of a Kronecker NN in a more computational efficient manner on a resource-constrained hardware device.

Figure 1:
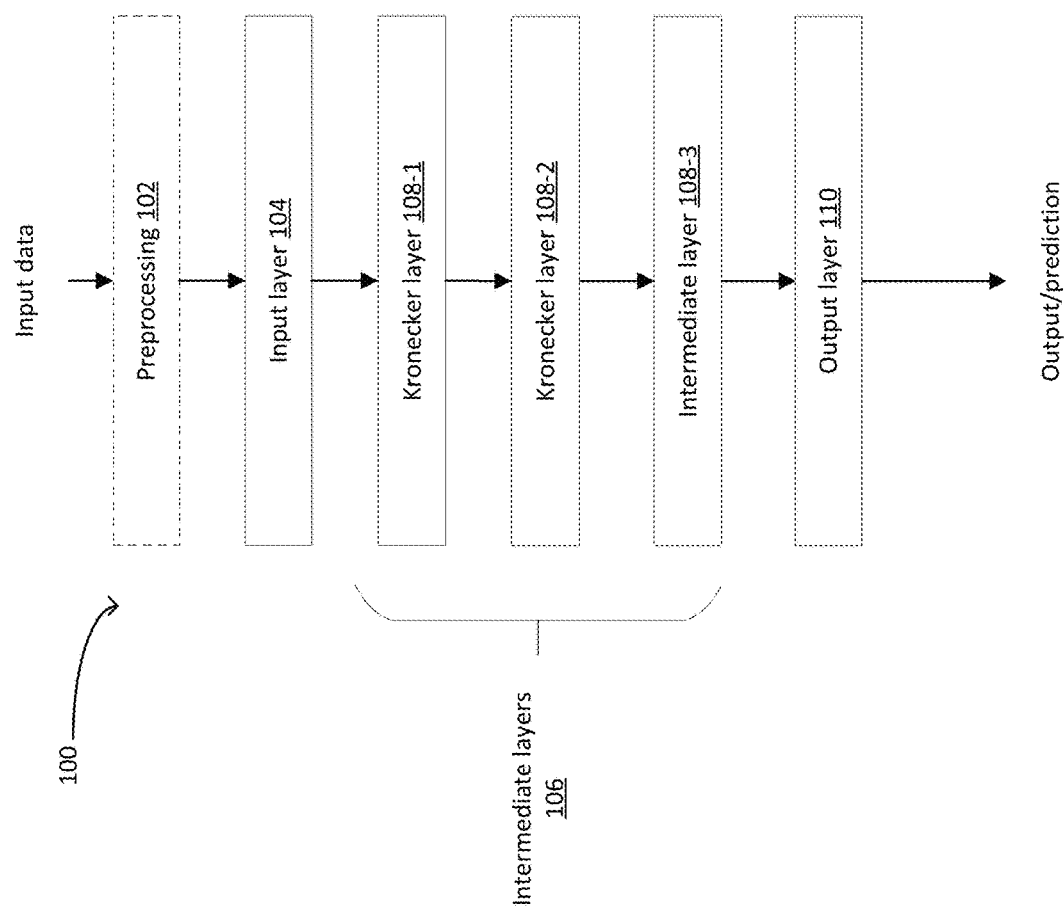
FIG. 1 illustrates an architecture of a Kronecker NN, according to example embodiments.

FIG. 1 illustrates an example architecture of a Kronecker NN 100 which performs an inference task. Optional elements are shown in dashed lines. The Kronecker NN 100 receives input data and process the input data to generate a prediction as described below. The input data may be, for example, image data or video data when the task performed by the Kronecker NN 100 is a computer-vision task, such as image recognition, image classification, object classification, or object detection. In some embodiments, the input data may be one-shot representation of text when the task performed by the Kronecker NN 100 is a natural language processing task, such as machine translation or text generation.

The Kronecker NN 100 includes an optional preprocessing layer 102, an input layer 104, a plurality of intermediate layers 106, and an output layer 110. In the embodiment shown in FIG. 1, the Kronecker NN includes three intermediate layers 106, including two Kronecker intermediate layers 108-1 and 108-2 and an intermediate layer 108-3 which is a feedforward layer.

The preprocessing layer 102 receives input data and performs various computations (e.g. normalization) on the input data to prepare the input data for processing by the input layer 104. The input layer 104 receives the input data after preprocessing by the preprocessing layer 102. It will be appreciated that in embodiments where the preprocessing layer 102 is omitted from the Kronecker NN 100, the input data is received directly by the input layer 104.

The output layer 110 is the final layer in the Kronecker NN 100. The output layer 110 has a similar structure as the intermediate layer 108-1, but may have extra computations that output probabilities for the input data (further details below).

The computations of the Kronecker NN 100 will now be described. The input data is propagated in the direction from the input layer 104 to the output layer 110. In general, the input data may have one, two or three (or more) dimensions, and the output data may have any suitable format, depending on the inference task being performed by the Kronecker NN 100. For instance, for a classification task such as animal recognition, which is a computer vision task, the input data to the input layer 104 may be an image, and the output data of the output layer 110 may be logits. Logits are unprocessed predictions of Kronecker NN 100. The input data in this scenario is a two-dimensional input data, and the output, which is logits, is processed in the output layer 110 to provide the likelihood of the image being a particular class, i.e. cat, dog, lion, etc.

The input data is processed by the preprocessing layer 102 to generate pre-processed data that is provided to the input layer 104. The input layer 104 receives the pre-processed data, performs computations on the pre-processed data to generate an output data representation. The output data representation generated by the input layer 104 is inputted to the Kronecker intermediate layer 108-1 which further processes the output data representation to generate a first output data representation, which is input to the second Kronecker intermediate layer 108-2. The second Kronecker intermediate layer 108-2 receives the first output data representation, processes the first output data representation and generates second output data representation, which is input to the intermediate layer 108-3. The intermediate layer 108-3 receives the second output data representation, processes the second output data representation, and generates a third output data representation, which is input to the output layer 110. The output layer 110 receives the third output data representation from the intermediate layer 108-3, processes the third output data representation to generate logits, which are the predictions generated by Kronecker NN 100. The output layer 110 may pass the logits (i.e. the predictions generated by the Kronecker NN 100, which are referred to herein as Kronecker NN predictions) to a function, such as a softmax function, to transform the logits into probabilities. In other words, the output layer 110 is a final layer in the Kronecker NN 100.

The computation to generate an output of a layer (computation block) of the Kronecker NN 100 depends on the type of the layer. If the layer is feedforward layer (i.e. not a Kronecker layer, which is referred to hereinafter as a "non-Kronecker layer"), such as the intermediate layer 108-3, the output of the layer, $x^{i+1}$, which is the second output data representation is computed as follows:

$$x^{i+1} = \sigma(W^i x^i + b^i) \quad (1)$$

$x^i$, which is the input to layer i, is a multidimensional vector and i is the layer number. $x^i$ is multiplied, using matrix multiplication, with $W^i$, which is a weight matrix including the values of weights of layer i. $b^i$ is a bias vector that the includes values of the biasof the layer i, and $\sigma(.)$ is an activation function that introduces non-linearity to its argument, which is $W^i x^i + b^i$ in equation (1). The values of weights in W and the values of the biases in the bias vector b of each layer i may be learned through training, a process described in further detail below. It is understood that the output of a layer $x^{i+1}$ is the input to a subsequent layer of the Kronecker NN 100. Further, the output of the output layer 110 includes the computations of equation (1) and computations to transform the logits into probabilities.

If the layer is a Kronecker layer, such as Kronecker intermediate layers 108-1 and 108-2, then the output of the Kronecker layer, denoted $x^{i+1}$, which is also the input a subsequent layer of the Kronecker NN 100, may be computed as follows:

$$x^{i+1} = \sigma((A^i \otimes B^i) x^i + b^i) \quad (2)$$

where $A^i$ and $B^i$ are matrices of learnable parameters, $\otimes$ is the Kronecker product operator, $b^i$ is a bias vector, and $\sigma(.)$ is an activation function that introduces non-linearity to its argument. The Kronecker product ($A \otimes B$) is multiplied with the input to the layer $x^i$ using matrix multiplication. The learnable parameters (i.e. the values of weights) in A and B of each Kronecker layer i may be learned using a training process described in further detail below.

In some embodiments, the input layer 104 and/or the output layer 110 of the Kronecker NN 100 may be a Kronecker layer. In such embodiments, equation (2) is used to compute the output of the input layer and/or the output layer instead of equation (1).

The Kronecker product operator, $\otimes$, is an operation performed on two matrices (A and B) resulting in a block matrix. If A is a matrix of size $m_1 \times n_1$, and B is a matrix of size $m_2 \times n_2$, then the Kronecker product of matrices A and B is a block matrix of size $m \times n$, where $m = m_1 \times m_2$ and $n = n_1 \times n_2$. To generate $A \otimes B$, each element of matrix A (i.e. $a_{11}$, $a_{12}, \ldots a_{m_1 n_1}$) is multiplied by the matrix B such that:

$$A \otimes B = \begin{bmatrix} a_{11}B & \cdots & a_{1n_1}B \\ \vdots & \ddots & \vdots \\ a_{m_1 1}B & \cdots & a_{m_1 n_1}B \end{bmatrix} \quad (3)$$

Learnable parameters of a Kronecker layer (e.g. 108-1 and 108-2) require less memory to store than is required to store the learnable parameters of non-Kronecker layer (e.g. intermediate layer 108-3) while the resulting block matrix that includes a similar amount of information as the learnable parameters of the non-Kronecker layer. The learnable parameters of the Kronecker layer are the elements of the matrices A and B, and the elements of the bias vector b, as in equation (2), whereas the learnable parameters of the non-Kronecker layer are weights of the matrix W and biases of the bias vector b, as in equation (1). The amount of memory required to store the bias vector, b, (if it exists) is the same for both a Kronecker layer and a non-Kronecker; however, the amount of memory required to store matrices A and B of a Kronecker layer is less than the amount of memory required to store matrix W, while W and A⊗B may be including a similar amount of information.

The Kronecker NN 100 shown in FIG. 1 has been simplified, is not intended to be limiting, and is provided for the purpose of illustration only.

Compressing a Trained Neural Network by Training the Kronecker Neural Network Using Knowledge Distillation Compressing a NN which performs an inference task using knowledge distillation involves training the Kronecker NN 100 which performs the same inference task using supervisory signals from a trained NN. Training of the Kronecker NN 100 is a process that adjusts values of the learnable parameters (weights of matrix $W^i$ and biases of bias vector $b^i$) of each layer i that is non-Kronecker layer (e.g. intermediate layers 108-3 or output layer 110) of the Kronecker NN 100 and the values of the learnable parameters (weights of matrices $A^i$ and $B^i$ and biases of bias vector $b^i$) of each Kronecker layer (e.g. Kronecker intermediate layers 108-1 and 108-2) of the Kronecker NN 100. Training the Kronecker NN 100 generates a trained Kronecker NN 100 with learned (i.e. optimized) values for the learnable parameters of each layer (i.e. Kronecker and non-Kronecker layers) of the Kronecker NN 100.

Knowledge distillation (KD), proposed in "Hinton, Geoffrey, Oriol Vinyals, and Jeff Dean. 'Distilling the knowledge in a neural network.' arXiv preprint arXiv:1503.02531 (2015)," is an efficient method for distilling knowledge from a trained teacher NN trained to a student NN. In situations where the trained NN is the teacher NN, and the Kronecker NN 100 is the student NN, the method for compressing a trained NN of the present disclosure uses KD to compress the trained NN (the teacher network) in order to generate a Kronecker NN which can be deployed to computationally constrained hardware device for execution. During training, the Kronecker NN 100 mimics the trained NN and minimizes a training error ($L_{student}$ explained in detail below) of the Kronecker NN. The Kronecker NN 100 mimics the trained NN in the sense that each layer (or more) of the Kronecker NN 100 has a corresponding layer in the trained NN. The layers of the Kronecker NN 100 attempts to perform similarly to the respective layers in the trained NN; hence, the layers of the Kronecker NN 100 mimics (in performance) corresponding layers in the trained NN. The training error (loss) is computed by comparing the Kronecker NN predictions (e.g. logits of the Kronecker NN) to ground-truth labels from a training dataset as described in further detail below.

While the term Kronecker NN predictions in the present disclosure refers to the logits output by the output layer 110 of the Kronecker 100, in alternative embodiments, the Kronecker NN predictions may be the output of a softmax performed on the logits output by the output layer 110.

Figure 2:
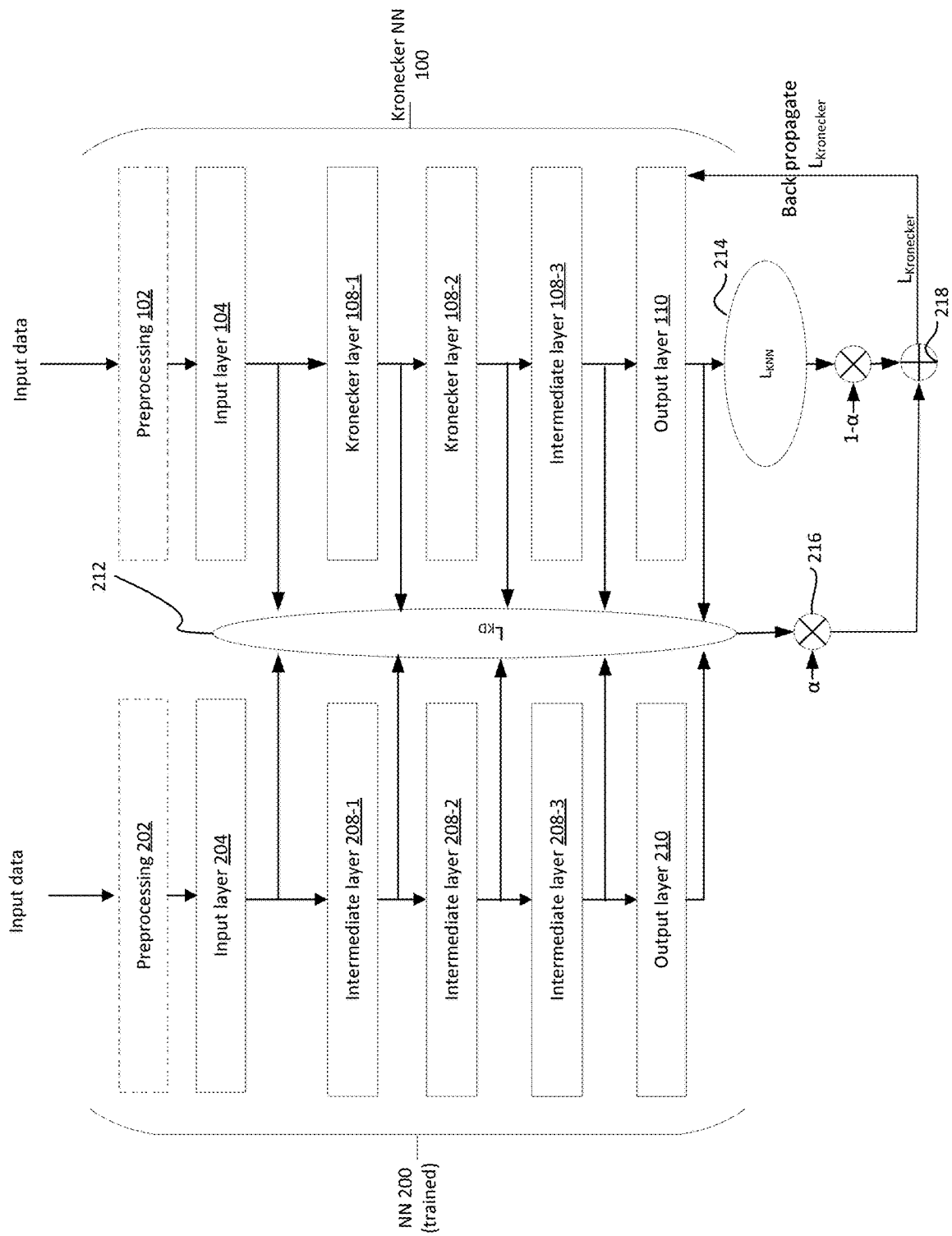
FIG. 2 is a block diagram illustrating data flow of a method for compressing a neural network using knowledge distillation, according to example embodiments.

Referring to FIG. 2, a block diagram which shows data flow of an example method for compressing a NN by training the Kronecker NN 100 using knowledge distillation. In FIG. 2, a NN 200, which is previously trained, is used to help train the Kronecker NN 100. During training of the Kronecker NN 100, the trained NN 200 distills knowledge (e.g., by providing supervisory signals) to the Kronecker NN 100. The Kronecker NN 100, after being trained, is considered to be a "compressed version" of the trained NN 200 because the Kronecker NN 100 contains fewer learnable parameters and optionally fewer layers than the NN 200.

The Kronecker NN 100 is trained using a training dataset and a supervised learning algorithm as described in further detail below. The NN 200 includes an optional pre-processing layer 202, an input layer 204, a plurality of intermediate layers 208-1, 208-2, and 208-3, and an output layer 210. The computations performed by the pre-processing layer 202, the input layer 204, the intermediate layers 208-1, 208-2, and 208-3), and the output layer 210 of the NN 200 are the same computations as those performed by the pre-processing layer 102, the input layer 104, the intermediate layer 108-3, and the output layer 110 of the Kronecker NN 100 described above. The NN 200 distills knowledge to the Kronecker NN 100 during training of the Kronecker NN 100 as described in further detail below.

It will be appreciated that the Kronecker NN 100 shown in FIG. 2 has the same total number of layers as the trained NN 200. In some embodiments, the Kronecker NN 100 may have a different number of layers (e.g. fewer layers) than the NN 200. Also, the Kronecker NN 100 shown in FIGS. 1 and 2 include three intermediate 106 (e.g. two Kronecker layers 108-1 and 108-2 and an intermediate layer 108-3) while the NN 200 includes three intermediate layers 208-1, 208-2, and 208-3. Intermediate layers 108-3, 208-1, 208-2, 208-3 are feedforward layers. Feedforward layers are also referred to as non-Kronecker layers herein. The other layers of the Kronecker NN 100 are the same type of layers as the corresponding layers of the NN 200 (i.e. the pre-processing layer 102, the input layer 104, and the output layer 110 of the Kronecker NN 100 are the same type of layer as the pre-pre-processing layer 202, the input layer 204 and the output layer 210 of the NN 200, respectively).

Training the Kronecker NN 100 learns the values of the learnable parameters of the Kronecker NN 100, including the values of the weights of the Kronecker matrices A and B and the value of the biases b of each Kronecker layer (i.e. Kronecker intermediate layers 108-1 and 108-2) and the values of the weight of the weight matrix W and the values of biases of the bias vector b of the non-Kronecker layers (i.e. the input layer 104, the intermediate layer 108-3 and output layer 110).

As noted above, the output of a Kronecker layer of the Kronecker NN 100 is computed using Kronecker matrices A and B. In contrast, an output of a given non-Kronecker layer of the NN 200 is computed using a weight matrix, denoted $W^i$, where i represents the layer number in the NN 200. In FIG. 2, There are five layers (not including the pre-processing layer 102), and the input layer 104 is the first layer (i=1) in the NN 200. The output of the Kronecker intermediate layer 108-1 (e.g. the first output data representation) is computed using the two matrices, A and B and the output of a corresponding intermediate layer 208-1 of the NN 200 (i.e. the second layer of the NN 200) is computed using the weight matrix $W^2$. Similarly, the Kronecker intermediate layer 108-2 is associated with two matrices, A and B and the corresponding intermediate layer 208-2 of the NN 200, which is the third layer in the NN 200, is associated with a weight matrix $W^3$.

The sizes of matrices A and B of a Kronecker layer (e.g. Kronecker layer 108-1 or 108-2) with respect to the size of the weight matrix W of the corresponding intermediate layers 208-1, 208-2 of the NN 200 may be an amount of compression achieved by the Kronecker NN 100. In some embodiments, the Kronecker product (A⊗B) of a Kronecker intermediate layer 108-1 or 108-2 has the same size as the weight matrix W of the corresponding intermediate layers 208-1 or 208-2 of the NN 200, respectively. For such embodiments, if $W \in \mathbb{R}^{m \times n}$ is associated with an intermediate layer (e.g. 208-1 or 208-2) of the NN 200, then $A \in R^{m_1 \times n_1}$ and $B \in R^{m/m_1 \times n/n_1}$ is associated with a Kronecker layer (e.g. 108-1 or 108-2), where $m_1$ and $n_1$ are integer numbers that divide m and n, respectively.

Compression is achieved when the amount of memory required to store matrices A and B for a Kronecker layer is smaller than the amount of memory required to store a matrix W for a corresponding non-Kronecker layer of the NN 200 (e.g. intermediate layers 208-1 and 208-2).

In some embodiments, the computation of the Kronecker product (A⊗B) for a given Kronecker layer in the Kronecker NN 100, such as Kronecker intermediate layer 108-1 or intermediate layer 108-2, may result in a block matrix having a different size than the weight matrix W of a given intermediate layer of the trained NN 200 that corresponds to the Kronecker layer (i.e. intermediate layer 208-1, or intermediate layer 208-2).

Training of the Kronecker NN 100 may begin with the values of the learnable parameters of the Kronecker intermediate layers 108-1, 108-2 (i.e. the values of the weights of matrices A and B) being randomly initialized.

FIG. 2 shows input data of a data sample obtained from a training dataset is provided to both the Kronecker NN 100 and the NN 200. For the purposes of the present disclosure, the training dataset is a dataset that includes a plurality of training data samples. Each training data sample is an x, y tuple where x is input data of the training data sample and y is a ground-truth label for the training data sample. The ground truth label may be a value that the NN 200 and Kronecker NN 100 are trained to predict. The ground-truth label may be a classification output (i.e. a class label) when the NN 200 and Kronecker NN 100 perform a classification task on images or videos. The ground-truth label may be a discrete value that maps to a word or a sentence which the NN 200 and the Kronecker NN 100 perform a Natural Language Processing (NLP) task. The ground-truth label may be a regression output when the NN 200 and Kronecker NN 100 perform a regression task. The regression output is a continuous value, such as house prices.

Training the Kronecker NN 100 uses knowledge distilled from (i.e. supervisory signals provided by) the trained NN 200. The Kronecker NN 100 is trained using batches of data samples (referred to "a training batch") obtained from the training dataset (as further described below). The training batch includes a number of data samples that are obtained from the training dataset. The input data for each data sample in the training batch is input to the Kronecker NN 100. The input to the Kronecker NN 100 is forward propagated through the Kronecker NN 100 to generate and output Kronecker NN predictions (e.g. logits) for Kronecker NN 100. The input data for each data sample in the training batch is inputted to the NN 200 and forward propagated through the NN 200 to generate and output Kronecker NN predictions (e.g. logits) for the NN 200. The Kronecker NN 100 uses backpropagation to optimize a total loss ($L_{Kronecker}$) for the Kronecker NN 100. The total loss $L_{Kronecker}$ for the Kronecker NN 100 is a weighted sum of two losses, a knowledge distillation loss $L_{KD}$ and a loss ($L_{KNN}$) for the Kronecker NN 100 such that $$L_{Kronecker} = \alpha L_{KD} + (1-\alpha) L_{KNN} \quad (4)$$

where α is a weighing factor of a value of less than or equal to 1. The loss $L_{KNN}$ for the Kronecker NN 100, is computed by $L_{KNN}$ block 214. $L_{KNN}$ block 214 receives the Kronecker NN predictions (e.g. logits) output by the output layer 110 of the Kronecker NN 100 and the ground-truth labels for the training batch computes the loss $L_{KNN}$ for the Kronecker NN 100, which is a cross entropy loss, as follows:

$$L_{KNN} = -\frac{1}{n}\sum_i^n y^i \log(\hat{y}^i) + (1-y^i)\log(1-\hat{y}^i) \quad (5)$$

where $y^i$ is the ground-truth label of the i-th data sample of n data samples of the training batch, and $\hat{y}^i$ is the Kronecker NN prediction generated and output by the output layer 110 of the Kronecker NN 100. Although loss $L_{KNN}$ computed by the loss $L_{KNN}$ block 214 is a cross-entropy loss in the embodiment shown in FIG. 2, it will be appreciated that in other embodiments, the loss $L_{KNN}$ for the Kronecker NN 100 computed by $L_{KNN}$ block 214 may be a minimum squared error, L1 loss, or contrastive loss.

The knowledge distillation loss $L_{KD}$ is computed by $L_{KD}$ block 212. $L_{KD}$ is computed by the $L_{KD}$ block 212 by comparing the output data representation of each layer of the Kronecker NN 100 with the output data representation generated by a corresponding non-Kronecker layer of the NN 200. The output data representation of each Kronecker intermediate layer of the Kronecker NN 100 is generated using equation (2) and the output data representation of each non-Kronecker layer of the NN 200 is generated using equation (1). In the embodiment shown in FIG. 2, $L_{KD}$ block 212 compares the output data representation generated by the input layer 204 of the NN 200 with the output data representation generated by input layer 104 of the Kronecker NN 100, the output data representation generated by the intermediate layer 208-1 of the NN 200 with the data representation generated by the Kronecker layer 108-1 of the Kronecker NN 100, the output data representation generated by the intermediate layer 208-2 of the NN 200 with the output data representation generated by the Kronecker layer 108-2 of the Kronecker NN 100 and so on for all layers of the Kronecker NN 100 that have corresponding layers in the trained NN 200.

The output data representation of each non-Kronecker layer can be generated using equation (1), and the output data representation for each Kronecker layer (e.g. the first output data representation generated by the Kronecker intermediate layer 108-1 and the second output data representation generated by the Kronecker layer 108-2) can be generated using equation (2). As noted above, the non-Kronecker layers are layers that do not require computation of the Kronecker product. The knowledge distillation loss $L_{KD}$ can be computed as follows:

$$L_{KD}(x) = \Sigma_i \lambda^i \text{MSE}(x_{Kronecker}^{i+1}, x_{NN}^{i+1}) \quad (6)$$

where x, is the input data of the data samples of the training batch, $\lambda^i$ is a hyper-parameter identifying the importance of loss computed between the i-th layer in the Kronecker NN 100 and the corresponding i-th layer in the trained NN 200, MSE is the minimum squared error computed as $(x_{Kronecker}^{i+1}, x_{NN}^{i+1})^2$, $x_{Kronecker}^{i+1}$, and $x_{NN}^{i+1}$ are inputs to layers i+1 of the Kronecker NN 100 and the NN 200, respectively, which also correspond to the outputs of layers i of the Kronecker NN 100 and the NN 200, respectively, calculated according to equation (1), if layer i is a non-Kronecker layer, and equation (2) if the layer i is a Kronecker layer.

In some embodiments, $L_{KD}$ of equation (6) is computed between only the Kronecker layers of the Kronecker NN 100 and the respective non-Kronecker layers of the NN 200. In such embodiments, $L_{KD}$ compares the output data representation generated by the intermediate layer 208-1 of the NN 200 with the output data representation generated by the Kronecker layer 108-1 of the Kronecker NN 100, and the output data representation generated by the layer 208-2 of the NN 200 with the output data representation generated by the Kronecker layer 108-2 of the Kronecker NN 100.

FIG. 2 shows the computed total loss $L_{Kronecker}$ for the Kronecker NN 100 is back propagated to update values of the learnable parameters of Kronecker NN 100 (i.e. the values of the weights of the matrices A and B and the values of the biases of the bias vector b (if it exists) for Kronecker layers and the values of the weights of the weight matrix W and the values of the biases of the bias vector b (if it exists) for non-Kronecker layers). As noted above, the total loss $L_{Kronecker}$ for the Kronecker NN 100 is a weighted sum of two $L_{KNN}$ and $L_{KD}$. $L_{KNN}$ IS computed by the $L_{KNN}$ block 214, which compares the Kronecker NN predictions the input data of a batch to the ground-truth label of the respective input data using the Kronecker NN 100. $L_{KD}$ is the knowledge distillation loss computed in the $L_{KD}$ block 212, which implements equation (6) above. The multiplication units, one of which is labeled as 216, output the multiplication of the multiplication units' inputs. The addition unit 218 outputs the addition of the addition unit's input.

Figure 3:
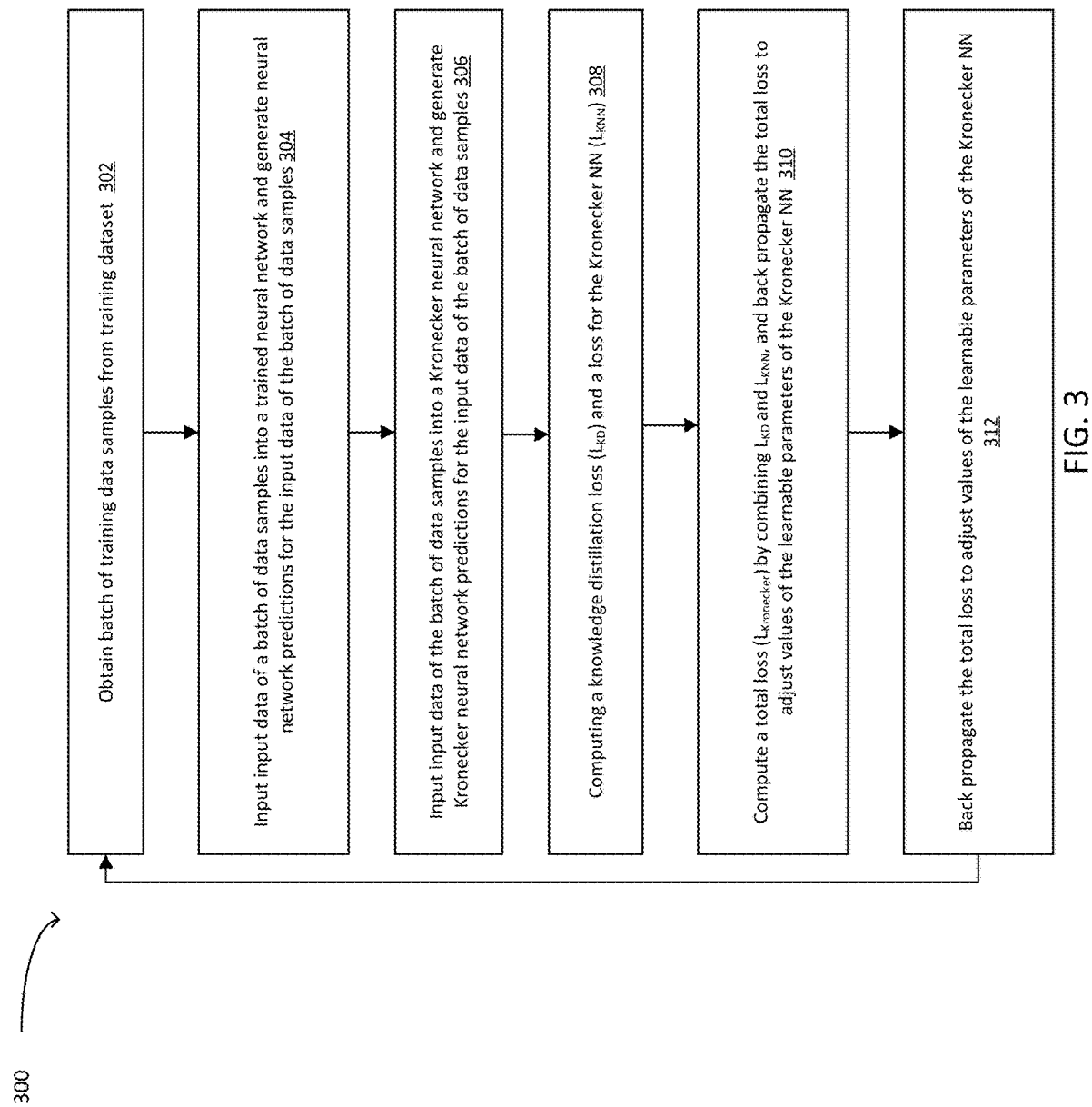
FIG. 3 is a flowchart of an method for compressing a neural network, according to example embodiments.

FIG. 3 is a flowchart of an example method for compressing a NN 200 that includes training a Kronecker NN 100 using knowledge distillation. The method 300 begins at operation 302. At operation 302, a training batch that includes a number of data samples is obtained from a training dataset. As mentioned above, each data sample in the training batch includes input data x and a ground-truth label y. The method 300 then proceeds to operation 304.

At operation 304, the input data of the data samples of the training batch are inputted into the NN 200 to forward propagate the input data of the data samples of the training batch through the NN 200 and to generate NN predictions for the input data of the data samples of the training batch. The method 300 then proceeds to operation 306.

At operation 306, the input data of the data samples of the training batch are inputted into the Kronecker NN 100 to forward propagate the input data of the data samples of the training batch through the Kronecker NN 100 and to generate Kronecker NN predictions for the input data of the data samples of the training batch. The method 300 then proceeds to operation 308.

At operation 308, the losses $L_{KNN}$ and $L_{KD}$ are computed using equations (5) and (6), respectively, as described above. The method then proceeds to operation 310 where a total loss $L_{Kronecker}$ for the Kronecker NN 100 is computed using equation (4) described above. The method 300 then proceeds to operation 312 where the total loss is back propagated to adjust the values of the learnable parameters (e.g. the values of the weights of matrices A and B) of the Kronecker NN 100.

Operations 302-312 are iteratively repeated until a stopping criterion is reached at which the learnable parameters of the Kronecker NN 100 are optimized and may be used for an inference task. The weights associated with a Kronecker layer are the elements of the matrices A and B, and the biases associated the Kronecker layer are the elements of the bias vector b, whereas the weight associated with the non-Kronecker layer are elements of the matrix W and the biases associated with the non-Knonecker layer are the elements of the bias vector b.

In each iteration, backpropagation adjusts the values of the learnable parameters of the Kronecker NN 100 (e.g., adjusts the values of the weights of the weight matrix W and the values of the biases of the bias vector b (if any) for each non-Kronecker layer of the Kronecker NN 100, and adjusts the values of weights of matrices A and B for each Kronecker layer of the Kronecker NN 100) so that the error (or loss) $L_{Kronecker}$, computed using equation (4), becomes smaller. Further, in each iteration, a gradient algorithm (e.g., gradient descent) is used to update the values of the learnable parameters (e.g. values of the weights and the values of the biases) to reduce the total loss $L_{Kronecker}$. The Kronecker NN 100, after training, may be deployed to a computationally constrained hardware device and used to make inferences.

For completeness, the NN 200 may be previously trained using the training dataset and a supervised learning algorithm. For each training iteration, the training dataset is sampled to obtain a batch of the data samples that is used to train the NN 200. Backpropagation is also performed during the training of the NN 200 to adjust (also referred to as update) values of learnable parameters (e.g., values of weights of the weight matrix W or the values of the biases of the bias vector b (if any)) in the NN 200 so that the error (or loss) in the NN predictions generated by the NN 200 becomes smaller. A loss, such as cross entropy loss, is computed after forward propagating the batch of input data starting from the pre-processing layer 202 (if included) to the input layer 204 to the output layer 210 of the NN 200, and a gradient algorithm (e.g., gradient descent) is used to adjust or update the values of the learnable parameters of NN 200. This process is done iteratively and with each iteration, the loss decreases until a stopping criterion is satisfied. After the NN 200 is trained, the learnable parameters of the NN 200 are fixed and the NN 200 may be used in real-time operations to make inferences (i.e. make predictions for new input data) and may be compressed using the method described above. In some embodiments, rather than computing a cross-entropy loss for the NN 200 during training, other loss functions may be used to compute the loss of the NN 200, such as minimum squared error loss.

Inference Making Using Kronecker Neural Network

After the Kronecker NN 100 has been trained, the trained Kronecker NN 100 may be used to make inferences (i.e. make predictions on new input data). The Kronecker NN 100 includes two Kronecker layers (i.e. Kronecker intermediate layers 108-1 and Kronecker intermediate layers 108-2) and each Kronecker layer has learned values of learnable parameters (e.g. learned values for the weights in matrices A and B and learned values for the biases in the bias vector b). During inference, input data x of data samples is forward propagated in the direction from the input layer 102 to the output layer 110, and each layer of the Kronecker NN 100 computes its output data representation using an input data representation and the learnable parameters for the layer using equation (1) if the layer is non-Kronecker layer and equation (2) if the layer is a Kronecker layer.

Computing the Kronecker product $A \otimes B$ in equation (2) may be computationally expensive. Embodiments of the present disclosure provide a method for generating an output data representation of a Kronecker layer of a Kronecker neural network using tiled matrix multiplication to compute the Kronecker product of matrices A and B of each Kronecker layer ($A \otimes B$). The method (referred to as a tiled matrix multiplication method) may use parallel computing and effectively use high-speed memories such as internal memories of the processing devices.

Figure 4:
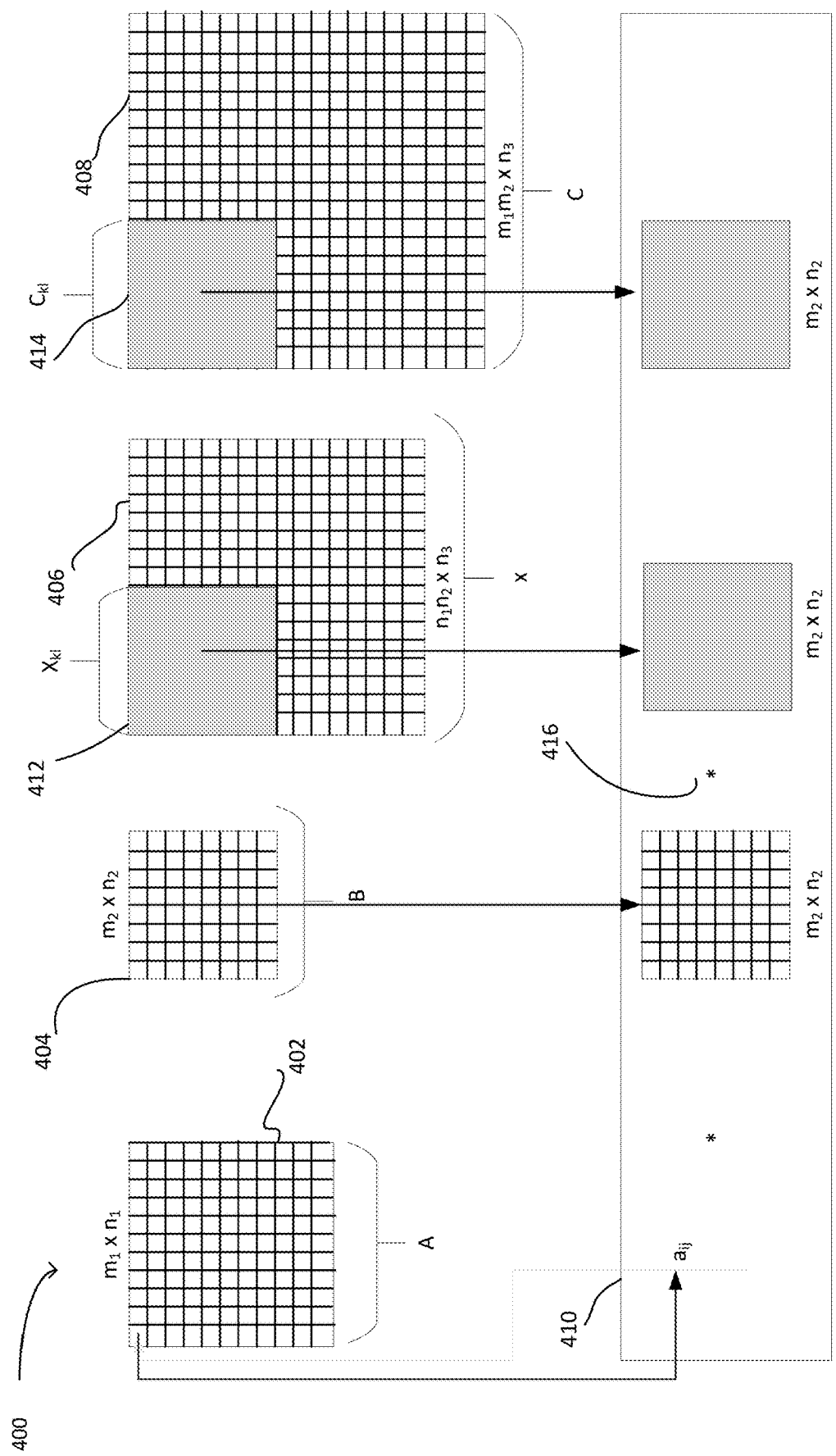
FIG. 4 is a schematic diagram illustrating one iteration of a tiled matrix multiplication method for multiplying a Kronecker product with a layer input matrix, according to example embodiments.

FIG. 4 is a schematic diagram illustrating one iteration of a tiled matrix multiplication method performed by a Kronecker layer of the Kronecker NN 100 to generate an output data representation for the Kronecker layer. The one iteration of the tiled matrix multiplication 400 shown in FIG. 4 is used to explain the multiplication of the Kronecker product operation with an input matrix x, which is an output data representation generated by a previously layer of the Kronecker NN 100, as shown in equation (2), i.e. C 408=(A 402⊗B 404)x 406. The matrices A 402 and B 404 include values for the weights associated with the Kronecker layer of the Kronecker NN 100 (e.g. Kronecker intermediate layer 108-1 or Kronecker intermediate layer 108-2) learned during training of the Kronecker NN 100. The input matrix x 406 is the input to the Kronecker layer, and C 408 is an output data representation generated by the Kronecker layer 100, which is shown as an output matrix C 408 in FIG. 4.

The matrices A 402, B 404, the input matrix x 406, and the output matrix C 408 are all stored in a memory structure 410 of a processing unit. FIG. 4 shows loading an element of matrix A 402 (i.e. $a_{ij}$) and the loading of all the elements of matrix B 404 into the memory structure of the processing unit 410 (e.g. internal memory of a processing device). Further, a tile $X_{kl}$ 412, which is a submatrix with indices k and l of the input matrix x, is also loaded into the memory structure 410 of the processing unit. The tile $X_{kl}$ 412 has the same size as the matrix B 404.

In each iteration of the tiled matrix multiplication method, a multiplication product involving the matrix multiplication of the Kronecker product (A⊗B) with the input matrix x is performed in the memory structure 410 of the processing unit. To compute the multiplication product, B 404 is multiplied by a tile $X_{kl}$ 412 using matrix multiplication operation*416, the result of which is then multiplied by the element $a_{ij}$ also using the matrix multiplication operation, this matrix multiplication is a scaler multiplication since the element $a_{ij}$ is a scaler value. The multiplication product is added to an intermediate tile matrix $C_{kl}$ 414 also stored in the memory structure 410. Hence, the intermediate tile matrix $C_{kl}$ 414 is computed as in the following equation.

$$C_{kl} = a_{ij} * B * X_{kl} + C_{kl} \qquad (7)$$

The intermediate tile matrix $C_{kl}$ 414 is part of the output matrix C 408. In other words, $C_{kl}$ 414 is a subset matrix of the output matrix C 408. The final value of the output matrix C 408 is generated when the one iteration for computing $C_{kl}$ is repeated for all tiles $X_{kl}$ 412 and all values of $a_{ij}$ of matrix A 402.

While the present embodiment describes loading matrix B 404 into memory structure 410, some embodiments may use tiles (subset matrix) for matrix B 404. Further, the tile $X_{kl}$ 412 is shown as being of the same size as matrix B 404. In some embodiments, tile $X_{kl}$ 412 and matrix B 404 have different sizes.

Referring again to FIG. 4, the matrices A 402, B 404, input data x 406, and the output matrix C 408 are all stored in memory while only $a_{ij}$,B 404, $X_{kl}$ 412, and $C_{kl}$ 414 are loaded into the memory structure of the processing unit 410 for computation. In some embodiments, the memory and the memory structure are the same memory.

Figure 5:
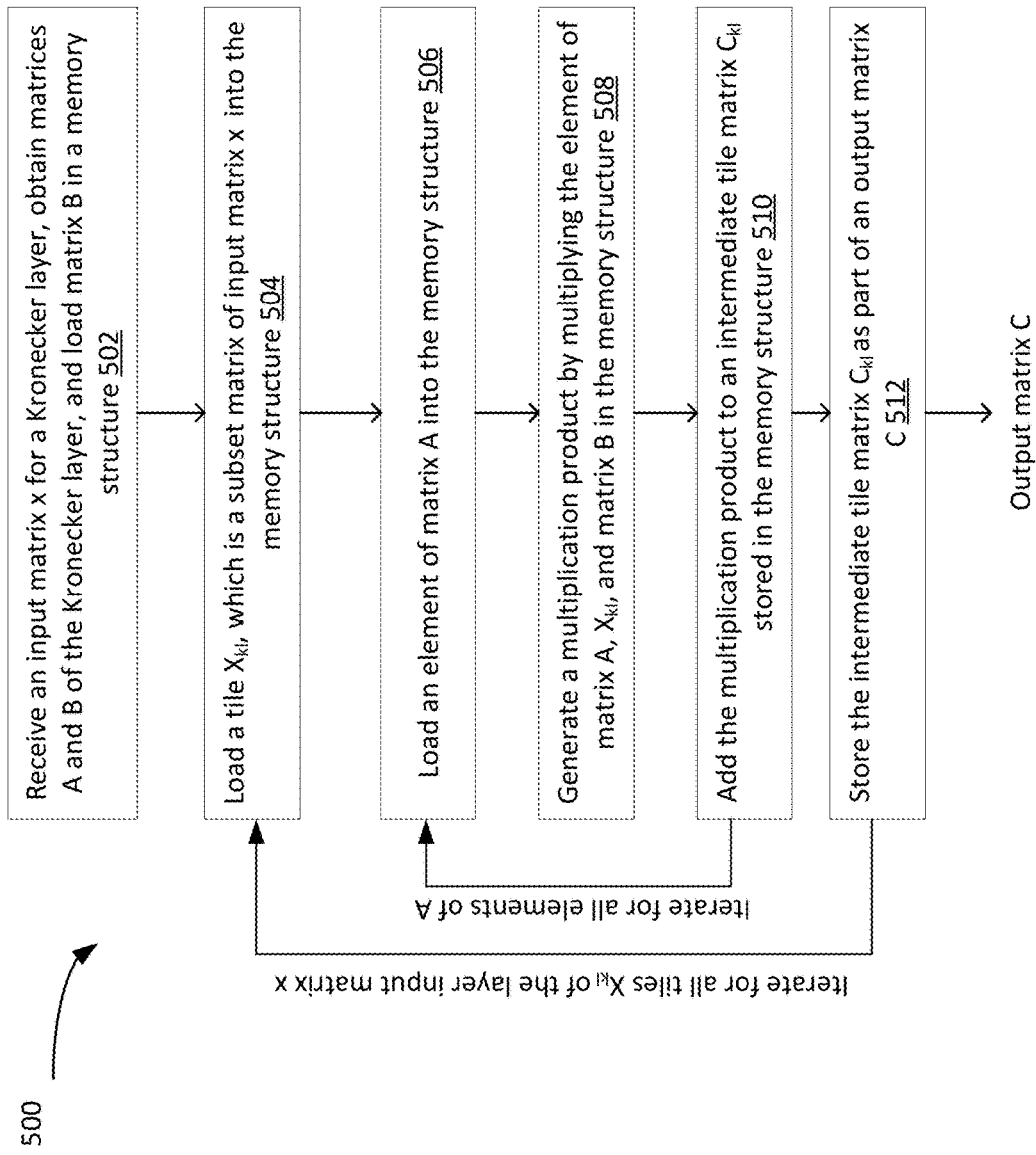
FIG. 5 is a flowchart of a method of computing an output of a Kronecker layer of a Kronecker neural network using one iteration of the tiled matrix multiplication method shown in FIG. 4, according to example embodiments.

FIG. 5 is a flowchart of a method 500 for performing the computations of a Kronecker layer of a Kronecker NN 100 during training or inference (i.e. when making predictions). The method 500 uses the tiled matrix multiplication method described in FIG. 4. The method 500 computes the output matrix (C 408), which is the term (A 402⊗B 404)x 406 of equation (2). The method 500 begins at operation 502. At operation 502, the method 500 receives an input matrix x 406 and obtains, from memory, matrices A 402 and B 404 associated with the Kronecker layer. The method 500 loads matrix B 404 into a memory structure 410. The method 500 then proceeds to operation 504.

At operation 504, the method 500 begins iterating over every tile $X_{kl}$ 412 of the input matrix x 406, where each tile $X_{kl}$ 412 is a subset matrix of the input matrix x 406. For each tile $X_{kl}$ 412, the method 500 loads the tile being processed into the memory structure 410. The method 500 then proceeds to operation 506.

At operation, 506, the method 500 begins iterating over every element $a_{ij}$ of matrix A. For each tile $X_{kl}$ 412 being processed, the method 500 loads an element $a_{ij}$ of matrix A 402 into the memory structure 410. The method 500 then proceeds to operation 508.

At operation 508, the method 500 generates a multiplication product by multiplying $X_{kl}$ 412 with matrix B 404 with $a_{ij}$. The multiplication product is computed in the memory structure 410. The method 500 performs a first matrix multiplication between matrix B 404 and the tile $X_{kl}$ 412, then performs a second matrix multiplication by multiplying the result of the first matrix multiplication (scaler multiplication) by $a_{ij}$. The method 500 then proceeds to operation 510.

At operation 510, the multiplication product is added to an intermediate tile matrix $C_{kl}$ 414, which is also stored in the memory structure 410. The method 500 then iterates over all elements $a_{ij}$ (i.e. $a_{11}, a_{12}, \ldots$) of matrix A 402 to accumulate in $C_{kl}$ 414 by adding the multiplication product generated for each $a_{ij}$ to $C_{kl}$ 414. The method 500 then proceeds to operation 512. A final intermediate tile matrix $C_{kl}$ 414, which is part of an output matrix C 408, is determined when the multiplication product is generated for all elements of $a_{ij}$. The method 500 then proceeds to operation 512.

At operation 512, the method 500 stores in memory the final $C_{kl}$ of the processed $X_{kl}$ in output matrix C 408. The method 500 iterates and computes a final $C_{kl}$ for every $X_{kl}$, which collectively generate the output matrix C 408, which is stored in the memory.

This example embodiment stores the output matrix C 408 in a memory different from the memory structure 410; however, other example embodiments may store C 408 in the memory structure 410 as well.

Example embodiments of the method 500 may be implemented using a single thread performing all the described iterations and computations. Example embodiments of the method 500 may be implemented with parallel computing by using a plurality of threads; each thread may compute a portion of the term C=(A⊗B)x.

To compute the output of the Kronecker layer (108-1 or 108-2) as in equation (2), the output matrix C 408 is added to a bias vector b (if it exists) and n activation function applied to the result of adding the biases vector to the output matrix C 408. The method 500 may be used during training of the Kronecker NN 100 or during inference making when the Kronecker NN 100 is fully trained.

Figure 6:
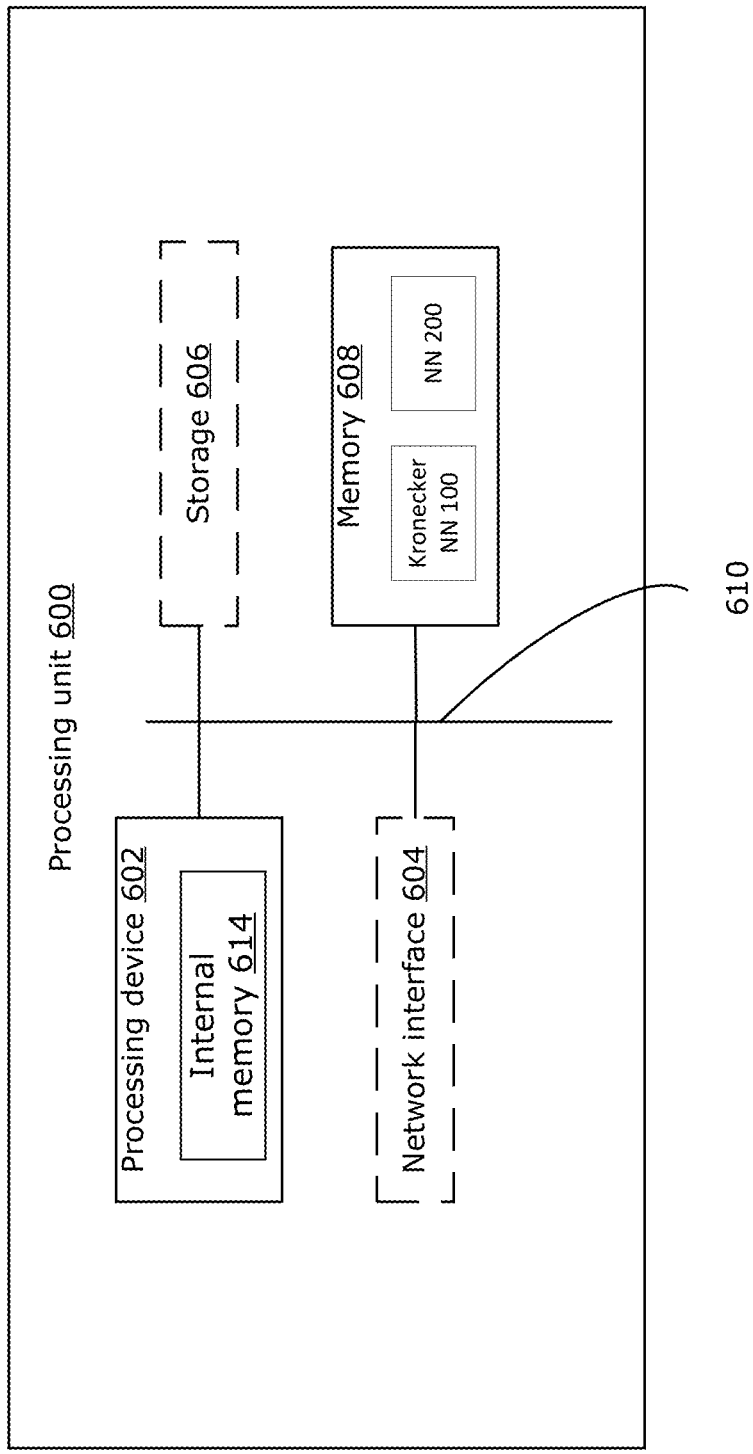
FIG. 6 is a block diagram of an processing system that may be used to implement examples of the methods described herein.

FIG. 6 is a block diagram of an example processing unit that includes a processing unit 600, which may be used to perform the methods for compressing a neural network 300 and the method 500 for performing the computations of a Kronecker layer of a Kronecker NN 100 using tiled matrix multiplication method as described above. Optional elements are shown in dashed lines. Other processing unit configurations suitable for implementing embodiments described in the present disclosure may be used, which may include components different from those discussed below.

For example, a dedicated hardware circuit, such as an ASIC or FPGA may be used to perform the methods of the present disclosure. Although FIG. 6 shows a single instance of each component, there may be multiple instances of each component in the processing unit 600.

The processing unit 600 may include one or more processing devices 602, such as a processor, a microprocessor, an application-specific integrated circuit (ASIC), a field-programmable gate array (FPGA), a dedicated logic circuitry, or combinations thereof. The processor may include one or more processing units, including, for example, one or more central processing units (CPUs), one or more graphical processing units (GPUs), one or more tensor processing units (TPUs), and other processing units.

The processing unit 600 may include one or more network interfaces 604 for wired or wireless communication with a network (e.g., an intranet, the Internet, a P2P network, a WAN and/or a LAN). The network interfaces 604 may include wired links (e.g., Ethernet cable) and/or wireless links (e.g., one or more antennas) for intra-network and/or inter-network communications.

Optionally, the processing unit 600 may also include one or more storage units 606, which may include a mass storage unit such as a solid-state drive, a hard disk drive, a magnetic disk drive and/or an optical disk drive. The processing unit 600 may include one or more memories 608, which may include a volatile or non-volatile memory (e.g., a flash memory, a random access memory (RAM), and/or a read-only memory (ROM)). The non-transitory memory(ies) 608 may store instructions for execution by the processing device(s) 602, such as to carry out examples methods 300, 500 of the present disclosure. In some embodiments, the non-transitory memory(ies) 608 may store instructions for execution by the processing device 602 which implement the NN 200 and to implement the Kronecker neural network 100. In some embodiments, the non-transitory memory(ies) 608 may be used to store matrices A 402 and B 404 which includes weights associated with each Kronecker layer of the Kronecker NN 100 and weight matrix W associated with each non-Kronekcer layer of the Kronecker NN 100. Also, the non-transitory memory(ies) 608 may store the bias vector b (if it exists) of each layer (Kronecker and non-Kronecker layers) in the Kronecker NN 100. The memory 608 may also store other matrices generated during tiled matrix the multiplication method 500 such as the output matrix C 408.

The non-transitory memory(ies) 608 may include other instructions, such as for implementing an operating system and other applications/functions. Memory 608 using methods of the present disclosure.

In some examples, one or more training datasets and/or modules may be provided by an external memory (e.g., an external drive in wired or wireless communication with the processing unit 600) or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage.

The processing device 602 may include additional internal memory 614. The internal memory 614 is of limited resources but is characterized to be faster than the memory 608. It is usually better, if possible, to use the internal memory 614 instead of memory 608 because using internal memory may reduce the waiting time of reading and writing operations required when using memory 608. To appreciate the speed difference versus capacity of internal memory 614 and memory 608, example embodiments describe the processing unit 600 enabling data transfer between the processing device 602, such as CPU, and memory 608 to be 8 GB/s with memory 608 capacity of 48 GB. Example embodiments describe the processing unit 600 enabling data transfer between a processing device 602, such as GPU, and internal memory 614, a type of which is shared memory, to be 2.81-14.1 TB/s with the internal memory capacity of 48 KB.

In some embodiments, the memory structure 410 in FIG. 4 and FIG. 5 are the internal memory 614 of the processing device 608. In such embodiments, matrix B 404 in FIG. 4 is loaded into internal memory 614 throughout the operation of the tiled matrix multiplication method (e.g. method 500). For each iteration of the tiled matrix multiplication method 500, an element of matrix A 402, a tile $X_{kl}$ 412, and an intermediate tile matrix $C_{kl}$ 414 are loaded into the internal memory 614, and equation (7) above is computed by the processing device 602. In other example embodiments, the memory structure 410 in FIG. 4 and FIG. 5 may be the memory 608 of the processing unit 600.

There may be a bus 610 providing communication among components of the processing unit 600, including the processing device(s) 602, network interface(s) 604, storage unit(s) 606 and/or memory(ies) 608. The bus 610 may be any suitable bus architecture including, for example, a memory bus, a peripheral bus or a video bus.

FIG. 7 is a table showing experimental results of comparisons of performance of various NNs which perform a NLP task in making inferences. The NN 200 and its compressed version (i.e. Kronecker NN 100), are simple NNs, not intended to be limiting and are provided for the purpose of illustration only. The disclosed methods for compressing a neural network 300 and performing computations of a Kronecker layer of a Kronecker NN using a tiled matrix multiplication method 500 may be implemented for more complicated NNs. The NNs shown in FIG. 7 include a Bidirectional Encoder Representation from Transformers neural network, as described in "Devlin, Jacob, et al. 'Bert: Pre-training of deep bidirectional transformers for language understanding.' arXiv preprint arXiv:1810.04805 (2018)," referred to as BERT NN. BERT NN is highly over parameterized, which makes BERT NN's development on resource-constrained edge computing devices impractical.

The BERT NN is more complicated than NN 200. The BERT NN was compressed using the abovementioned method 300 to generate a corresponding Kronecker-BERT NN. In other words, the BERT NN may correspond to NN 200, and the Kronecker-BERT NN may correspond to Kronecker NN 100. Instead of having the non-Kronecker layers as described for NN 200, where output of each non-Kronecker layer is computed as in equation (1), BERT NN has transformer and embedding layers. The Kronecker-BERT NN generated using method 300 has compressed transformer and embedding layers represented as Kronecker transformer and Kronecker embedding layers. The tiled matrix multiplication method 500 may be used to compute the output of the Kronecker transformer and Kronecker embedding layers.

BERT NN model is estimated to have around 107 million parameters. The table in FIG. 7 examines two Kronecker-BERT NN, one compresses the BERT NN with a factor of 16 and the other with a factor of 7.5. The compression factor depends on the number of transformer and embedding layers compressed and the sizes of matrices A and B of each corresponding Kronecker transformer and Kronecker embedding layer, as described above for the simplified Kronecker NN 100.

The Kronecker-BERT NN is compared with LadaBERT in "Mao, Yihuan, et al. 'LadaBERT: Lightweight adaptation of BERT through hybrid model compression.' arXiv preprint arXiv:2004.04106 (2020)," referred to as LadaBERT NN. LadaBERT is an example of a previous work that compresses the BERT NN. The table in FIG. 7 shows LadaBERT that compresses the BERT NN with a factor of 10.

The examined BERT NN, LadaBERT NN, and Kronecker-BERT NN in FIG. 7 were evaluated on a set of training datasets, including MNL1, MNL1-mm, SST-2, MRPC, and QNLI. These training datasets are considered the General Language Understanding Evaluation (GLUE) benchmark, which is a collection of resources for training, evaluating and analyzing natural language understanding methods.

FIG. 7 shows that the Kronecker-BERT NN with compression factors of 7.5 and 16 reduced the average performance rate of the of BERT NN, which is used in training the Kronecker-BERT NN, from 87.9% to 85.94% and 84.98%, respectively. On the other hand, Lada-BERT NN, with a compression factor of 10, has an average performance rate of 62.6%.

The disclosed method for compressing a neural network 300 and method 500 for performing computations of a Kronecker layer of a Kronecker NN 100 using a tiled matrix multiplication may be implemented using machine executable instructions which are stored in memory 608 and internal memory 614 executed by the processing unit 600. Coding of software for carrying out the steps of the methods is well within the scope of a person of ordinary skill in the art having regard to the methods. The methods for compressing a neural network 300 and tiled matrix multiplication 500 may contain additional or fewer steps than shown and described, and the steps may be performed in a different order. Computer-readable instructions, executable by the processor(s) of the processing unit 600, may be stored in the memory 608 or internal memory 614 of the processing unit 600 or a computer-readable medium. It is to be emphasized that the steps of the methods need not be performed in the exact sequence as shown unless otherwise indicated; and likewise, various steps of the methods may be performed in parallel rather than in sequence.

It can be appreciated that the methods for compressing a neural network and for performing computations of a Kronecker layer of a Kroenke NN using a tiled matrix multiplication method of the present disclosure, once implemented, can be performed by the processing unit 600 in a fully-automatic manner, which is convenient for users to use as no manual interaction is needed.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed systems and methods may be implemented in other manners. For example, the described system embodiments are merely examples. Further, units or components may be combined or integrated into another system, or some features may be ignored or not performed. In addition, the displayed or discussed mutual couplings or direct couplings or communication connections may be implemented by using some interfaces. The indirect couplings or communication connections between the systems or units may be implemented in electronic, mechanical, or other forms.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices, and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, they may be stored in a storage medium and include several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations but are not intended to limit the scope of protection. Any variation or replacement readily figured out by a person skilled in the art within the technical scope shall fall within the scope of protection. Therefore, the scope of protection shall be subject to the protection scope of the claims.

What is claimed is:

1. A method for compressing a neural network which performs an inference task, the method comprising:
    obtaining a batch of data samples from a training dataset, each data sample comprising input data and a respective ground-truth label;
    inputting the input data of the data samples of the batch into a trained neural network to forward propagate the input data of the data samples of the batch through the neural network and generate neural network predictions for the input data of the data samples of the batch;
    inputting the input data of the data samples of the batch into a Kronecker neural network to forward propagate the input data of the data samples of the batch through the Kronecker neural network to generate Kronecker predictions for the input data of the data samples of the batch;

computing a knowledge distillation loss based on outputs generated by a layer of the neural network and a corresponding Kronecker layer of the Kronecker neural network, wherein the Kronecker layer has a first parameter matrix and a second parameter matrix storing learnable parameters of the Kronecker layer of the Kronecker neural network, and the output of the Kronecker layer is generated based on tiled matrix multiplication of a Kronecker product of the first parameter matrix and the second parameter matrix and a plurality of tiles of an input matrix, each tile comprising a respective subset matrix of the input matrix;

computing a loss for the Kronecker neural network based on the Kronecker neural network predictions and ground-truth labels of the data samples of the batch;

combining the knowledge distillation loss and the loss for the Kronecker neural network to generate a total loss for the Kronecker neural network; and back propagating the total loss through the Kronecker neural network to adjust values of learnable parameters of the Kronecker neural network.

2. The method of claim 1, wherein the knowledge distillation loss ($L_{KD}$) between the output generated by the Kronecker layer of the Kronecker neural network and the corresponding layer of the neural network is computed by:

$$L_{KD}(x) = \sum_i \lambda^i MSE\left(x_{Kronecker}^{i+1}, x_{NN}^{i+1}\right)$$

where $\lambda^i$ is a hyper-parameter for the Kronecker intermediate layer of the Kronecker neural network, MSE is the minimum squared error, $x_{Kronecker}^{i+1}$, and $x_{NN}^{i+1}$ are inputs to layers i+1 of the Kronecker neural network and the corresponding layer of the neural network, respectively.

3. The method of claim 1, wherein computing the knowledge distillation loss is based on outputs generated by a plurality of layers of the neural network and a corresponding plurality of Kronecker layers of the Kronecker neural network.

4. The method of claim 1, wherein generating the output of the Kronecker layer comprises:
receiving the input matrix storing input data for the Kronecker layer;
loading the second parameter matrix for the Kronecker layer into a first memory structure;
processing each of the plurality of tiles of the input matrix successively by:
loading the tile being processed in the first memory structure;
for each element included in the first parameter matrix:
loading the element in the first memory structure;
multiplying the second parameter matrix, the tile being processed, and the element to generate a multiplication product matrix; and
adding the multiplication product matrix to an intermediate tile matrix stored in the first memory structure; and
when the multiplication product matrix for each of the elements has been added to the intermediate tile matrix, storing the intermediate tile matrix as part of an output matrix in a second memory structure.

5. The method of claim 4, wherein the first memory structure is an internal memory of a processor that performs the multiplication.

6. The method of claim 4, wherein the size of each tile is the size of the second parameter matrix.

7. The method of claim 1, wherein the learnable parameters of the Kronecker layer of the Kronecker neural network require less memory to store than the learnable parameters of the corresponding layers of the neural network.

8. A method for computing an output of a Kronecker layer of a Kronecker neural network, the Kronecker layer having a first parameter matrix and a second parameter matrix storing learned values of parameters of the Kronecker layer of Kronecker neural network, comprising:
receiving an input matrix storing input data for the Kronecker layer;
loading the second parameter matrix for the Kronecker layer into a first memory structure;
processing each of a plurality of tiles of the input matrix successively, each tile comprising a respective subset matrix of the input matrix, the processing of each respective tile comprising:
loading the tile being processed in the first memory structure;
for each element included in the first parameter matrix:
loading the element in the first memory structure;
multiplying the second parameter matrix, the tile being processed, and the element to generate a multiplication product matrix; and
adding the multiplication product matrix to an intermediate tile matrix stored in the first memory structure; and
when the multiplication product matrix for each of the elements has been added to the intermediate tile matrix, storing the intermediate tile matrix as part of an output matrix in a second memory structure.

9. The method of claim 8, wherein the first memory structure is an internal memory of a processor that performs the multiplication.

10. The method of claim 8, wherein the size of each tile is the size of the second parameter matrix.

11. A system for determining the output of at least one Kronecker layer, comprising:
a processor; and
a memory storing instructions which, when executed by the processor device, cause the system to:
obtain a batch of data samples from a training dataset, each data sample comprising input data and a respective ground-truth label;
input the input data of the data samples of the batch into a trained neural network to forward propagate the input data of the data samples of the batch through the neural network and generate neural network predictions for the input data of the data samples of the batch;
input the input data of the data samples of the batch into a Kronecker neural network to forward propagate the input data of the data samples of the batch through the Kronecker neural network to generate Kronecker predictions for the input data of the data samples of the batch;
compute a knowledge distillation loss based on outputs generated by a layer of the neural network and a corresponding Kronecker layer of the Kronecker neural network, wherein the Kronecker layer has a first parameter matrix and a second parameter matrix storing learnable parameters of the Kronecker layer of the Kronecker neural network, and the output of the Kronecker layer is generated based on tiled matrix multiplication of a Kronecker product of the first parameter matrix and the second parameter matrix and a plurality of tiles of an input matrix, each tile comprising a respective subset matrix of the input matrix;

compute a loss for the Kronecker neural network based on the Kronecker neural network predictions and ground-truth labels of the data samples of the batch;

combine the knowledge distillation loss and the loss for the Kronecker neural network to generate a total loss for the Kronecker neural network; and back propagate the total loss through the Kronecker neural network to adjust values of learnable parameters of the Kronecker neural network.

12. The system of claim 11, wherein the knowledge distillation loss ($L_{KD}$) between the output generated by the Kronecker layer of the Kronecker neural network and the corresponding layer of the neural network is computed by:

$$L_{KD}(x) = \sum_i \lambda^i MSE(x^{i+1}_{Kronecker}, x^{i+1}_{NN})$$

where $\lambda^i$ is a hyper-parameter for the Kronecker layer of the Kronecker neural network, MSE is the minimum squared error, $x_{Kronecker}^{i+1}$, and $x_{NN}^{i+1}$ are inputs to layers i+1 of the Kronecker neural network and the corresponding layer of the neural network, respectively.

13. The system of claim 11, wherein computing the knowledge distillation loss is based on outputs generated by a plurality of layers of the neural network and a corresponding plurality of Kronecker layers of the Kronecker neural network.

14. The system of claim 11, wherein the instructions, when executed by the processor device to generate the output of the Kronecker layer, cause the system to:

receive the input matrix storing input data for the Kronecker layer;

load the second parameter matrix for the Kronecker layer into a first memory structure;

process each of the plurality of tiles of the input matrix successively, the processing of each respective tile comprising:

loading the tile being processed in the first memory structure;

for each element included in the first parameter matrix:
loading the element in the first memory structure;
multiplying the second parameter matrix, the tile being processed, and the element to generate a multiplication product matrix; and
adding the multiplication product matrix to an intermediate tile matrix stored in the first memory structure; and when the multiplication product matrix for each of the elements has been added to the intermediate tile matrix, store the intermediate tile matrix as part of an output matrix in a second memory structure.

15. The system of claim 14, wherein the first memory structure is an internal memory of a processor that performs the multiplication.

16. The system of claim 14, wherein the size of each tile is the size of the second parameter matrix.

17. The system of claim 11, wherein the learnable parameters of the Kronecker layer of the Kronecker neural network require less memory to store than the learnable parameters of the corresponding layers of the neural network.

18. A system for computing an output of a Kronecker layer of a Kronecker neural network, the Kronecker layer having a first parameter matrix and a second parameter matrix storing learnable parameters of the Kronecker layer of Kronecker neural network, comprising:

a processor; and a memory storing instructions which, when executed by the processor device, cause the system to:

receive an input matrix storing input data for the Kronecker layer;

load the second parameter matrix for the Kronecker layer into a first memory structure;

process each of a plurality of tiles of the input matrix successively, each tile comprising a respective subset matrix of the input matrix, the processing of each respective tile comprising:

loading the tile being processed in the first memory structure;

for each element included in the first parameter matrix:
loading the element in the first memory structure;
multiplying the second parameter matrix, the tile being processed, and the element to generate a multiplication product matrix; and
adding the multiplication product matrix to an intermediate tile matrix stored in the first memory structure; and when the multiplication product matrix for each of the elements has been added to the intermediate tile matrix, storing the intermediate tile matrix as part of an output matrix in a second memory structure.

19. The system of claim 18, wherein the first memory structure is an internal memory of a processor that performs the multiplication.

20. The system of claim 18, wherein the size of each tile is the size of the second parameter matrix.

* * * * *

UNITED STATES PATENT AND TRADEMARK OFFICE
CERTIFICATE OF CORRECTION

| | | |
|---|---|---|
| PATENT NO. | : 12,236,337 B2 | Page 1 of 1 |
| APPLICATION NO. | : 17/322674 | |
| DATED | : February 25, 2025 | |
| INVENTOR(S) | : Marziehsadat Tahaei et al. | |

It is certified that error appears in the above-identified patent and that said Letters Patent is hereby corrected as shown below:

In the Specification

Column 8, Line 1:
"$x^{1+1}$" should read -- $x^{i+1}$ --

Column 11, Line 1:
"A∈$R^{m\ i \times n\ 1}$" should read -- $A \in R^{m_1 \times n_1}$ --

Signed and Sealed this
Eighth Day of April, 2025

Coke Morgan Stewart
*Acting Director of the United States Patent and Trademark Office*